US012298690B2

(12) United States Patent
Takeuchi et al.

(10) Patent No.: US 12,298,690 B2
(45) Date of Patent: May 13, 2025

(54) FIXING DEVICE

(71) Applicant: CANON KABUSHIKI KAISHA, Tokyo (JP)

(72) Inventors: Suguru Takeuchi, Chiba (JP); Ryo Yashiro, Tokyo (JP); Masayuki Tamaki, Chiba (JP); Shinsuke Takahashi, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/752,666

(22) Filed: Jun. 24, 2024

(65) Prior Publication Data

US 2024/0345514 A1 Oct. 17, 2024

Related U.S. Application Data

(62) Division of application No. 18/300,317, filed on Apr. 13, 2023, now Pat. No. 12,044,991.

(30) Foreign Application Priority Data

Jun. 14, 2022 (JP) ................................ 2022-095966

(51) Int. Cl.
*G03G 15/20* (2006.01)

(52) U.S. Cl.
CPC ..... *G03G 15/2025* (2013.01); *G03G 15/2053* (2013.01)

(58) Field of Classification Search
CPC ........... G03G 15/2053; G03G 15/2064; G03G 15/2025; G03G 2215/2035
See application file for complete search history.

(56) References Cited

U.S. PATENT DOCUMENTS

| | | | | |
|---|---|---|---|---|
| 6,049,685 | A | 4/2000 | Murakami et al. .... | G03G 15/08 |
| 8,712,271 | B2 | 4/2014 | Nakayama et al. ... | G03G 15/20 |
| 8,712,272 | B2 | 4/2014 | Takeuchi et al. ...... | G03G 15/20 |
| 8,750,739 | B2 | 6/2014 | Tamaki et al. ......... | G03G 15/20 |
| 8,862,009 | B2 | 10/2014 | Takeuchi et al. ...... | G03G 15/20 |
| 8,909,114 | B2 | 12/2014 | Takeuchi ............... | G03G 15/20 |
| 8,983,325 | B2 | 3/2015 | Takeuchi ............... | G03G 15/20 |

(Continued)

FOREIGN PATENT DOCUMENTS

| | | |
|---|---|---|
| JP | H10-198200 | 7/1998 |
| JP | 2001-341143 | 12/2001 |

*Primary Examiner* — Jessica L Eley
(74) *Attorney, Agent, or Firm* — Venable LLP

(57) ABSTRACT

A fixing device includes an endless and rotatable belt of which an inner peripheral surface is applied with lubricant, a heater, a rotatable member to rotatably contact the belt and a nip forming member in contact with the inner peripheral surface of the belt. The nip forming member includes a holding portion, an upstream sliding portion and a downstream sliding portion. The downstream and upstream sliding portions have first and second sliding surfaces sliding with the inner peripheral surface of the belt, respectively. The second sliding surface has a curved shape, and when a force applied to the belt with respect to a length of the second sliding surface is defined as w (N/mm) and a curvature radius of the second sliding surface is defined as R (mm), R/w of the second sliding surface is equal to 5 ($mm^2/N$) or larger and equal to 80 ($mm^2/N$) or less.

6 Claims, 7 Drawing Sheets

(a) BEFORE PRESSURIZATION (b) AFTER PRESSURIZATION

(56) References Cited

U.S. PATENT DOCUMENTS

| | | | | |
|---|---|---|---|---|
| 9,002,249 | B2 * | 4/2015 | Uekawa | G03G 15/2017 399/329 |
| 9,057,993 | B2 | 6/2015 | Takeuchi et al. | G03G 15/20 |
| 9,274,467 | B2 | 3/2016 | Takeuchi et al. | H05B 6/10 |
| 9,354,570 | B2 | 5/2016 | Arimoto et al. | G03G 15/20 |
| 9,417,576 | B2 * | 8/2016 | Minamishima | G03G 15/206 |
| 9,488,938 | B2 | 11/2016 | Tamaki et al. | G03G 15/20 |
| 9,504,096 | B2 | 11/2016 | Kakubari et al. | G03G 15/20 |
| 9,513,592 | B2 | 12/2016 | Akiyama et al. | G03G 15/20 |
| 9,519,250 | B2 | 12/2016 | Asaka et al. | G03G 15/20 |
| 10,241,455 | B2 | 3/2019 | Fukamachi et al. | G03G 15/20 |
| 10,303,093 | B2 | 5/2019 | Tamaki et al. | G03G 15/20 |
| 10,437,185 | B2 | 10/2019 | Yamaguchi et al. | G03G 15/20 |
| 10,545,442 | B1 | 1/2020 | Hirano et al. | G03G 15/20 |
| 10,627,751 | B2 | 4/2020 | Hasegawa et al. | G03G 15/20 |
| 10,691,053 | B2 | 6/2020 | Takada et al. | G03G 15/00 |
| 10,725,403 | B2 | 7/2020 | Tamaki et al. | G03G 15/20 |
| 10,845,742 | B2 | 11/2020 | Kawai et al. | G03G 15/20 |
| 10,871,735 | B2 | 12/2020 | Kawai et al. | G03G 15/20 |
| 10,877,412 | B2 | 12/2020 | Yashiro et al. | G03G 15/20 |
| 10,915,047 | B2 | 2/2021 | Tadomi et al. | G03G 15/20 |
| 10,955,775 | B2 | 3/2021 | Kawai et al. | G03G 15/20 |
| 11,144,008 | B2 | 10/2021 | Ito et al. | G03G 21/20 |
| 11,194,275 | B2 | 12/2021 | Takemasa et al. | G03G 15/20 |
| 11,269,272 | B2 | 3/2022 | Tatezawa et al. | G03G 15/20 |
| 11,300,906 | B2 | 4/2022 | Takemasa et al. | G03G 15/20 |
| 2006/0210288 | A1 | 9/2006 | Hayashi et al. | G03G 15/20 |
| 2010/0046986 | A1 | 2/2010 | Kim et al. | G03G 15/01 |
| 2022/0100134 | A1 | 3/2022 | Miyamoto et al. | G03G 15/20 |
| 2023/0400802 | A1 | 12/2023 | Tamaki et al. | G03G 15/20 |

* cited by examiner

FIXING DEVICE

CROSS-REFERENCE TO RELATED APPLICATIONS

This application is a divisional of U.S. application Ser. No. 18/300,317 filed Apr. 13, 2023; and claims priority under 35 U.S.C. § 119 to Japan Application JP 2022-095966 filed in Japan on Jun. 14, 2022; and the contents of all of which are incorporated herein by reference as if set forth in full.

FIELD OF THE INVENTION AND RELATED ART

The present invention relates to a fixing device which is suitable for applying to an image forming apparatus utilizing electrophotographic technology, such as a printer, a copier, a fax machine, or a multifunction printer.

In an image forming apparatus, a toner image is fixed to a recording material by a fixing device after forming the toner image on the recording material. Conventionally, a film heating type fixing device is proposed, which includes a fixing film which is heated by a heater and a pressing roller which presses the fixing film and forms a fixing nip portion, and applies heat and pressure to fix a toner image to a recording material when it passes through a fixing nip portion (Japanese Laid-Open Patent Application (JP-A) 2001-341143). A pressing pad, which holds the heater while sliding it against an inner peripheral surface of the fixing film and presses the fixing film by nipping between the pressing pad and the pressing roller at same time, is arranged inside the fixing film. And a lubricant, such as grease or oil, is interposed between the fixing film, the heater, and the pressing pad in order to reduce sliding frictional resistance between the fixing film and the heater and sliding frictional resistance between the fixing film and the pressing pad.

In a fixing device which is described in JP-A 2001-341143, it is easier to bear a lubricant by roughening an inner peripheral surface of a fixing film. In a fixing device which is described in Japanese Laid-Open Patent (JP-A) Hei 10-198200, it is easier to interpose a lubricant between a fixing film and a pressing pad by providing a plurality of grooves on a surface of a pressing pad. In this way, since thickness of the lubricant between the fixing film and the heater and thickness between the fixing film and the pressing pad are increased, it is possible to suppress slipping of the fixing film or making noses such as film squeal.

However, in the fixing device which is described in JP-A 2001-341143, since the inner surface of the fixing film becomes smoother due to sliding with the heater and the pressing pad as it is used and it becomes difficult to retain the lubricant on the inner surface of the fixing film, the fixing film may slip and make noses. On the other hand, in the fixing device described in JP-A Hei 10-198200, it may not be able to properly apply heat to the recording material. That is, when grooves are provided on the surface of the pressing pad, heat is transferred differently to the inner surface of the fixing film between groove portion in which the lubricant is filled and the other portion. On the inner surface of the fixing film which contacts with a portion in which a large amount of the lubricant is filled, it is hard to transfer heat to the fixing film since amount of the lubricant is large. Meanwhile, on the inner surface of the fixing film which contacts with a portion in which the lubricant is less, it is easy to transfer heat to the fixing film since the amount of the lubricant is small. Hence, uneven temperatures on the fixing film is caused, and fixing defects in the toner image on the recording material may be occurred.

In response to the above issue, it is an object of the present invention is to provide an image forming apparatus which is able to prevent the fixing film from slipping and making noises without causing uneven temperatures on the fixing film due to the lubricant.

SUMMARY OF THE INVENTION

According to an aspect of the present invention, there is provided a fixing device for fixing a toner image which is formed on a recording material, the fixing device comprising: an endless and rotatable belt of which an inner peripheral surface is applied with lubricant, a heater configured to heat the inner peripheral surface of the belt, a rotatable member configured to rotatably contact the belt, and a nip portion forming member in contact with the inner peripheral surface of the belt, configured to nip the belt with the rotatable member and form a nip portion, wherein the belt applies heat and pressure to a recording material on which a toner image is carried in the nip portion with the rotatable member to fix, wherein the nip portion forming member includes a holding portion, an upstream side sliding portion and a downstream side sliding portion, wherein the holding portion holds the heater in a rotational axis direction of the rotatable member, wherein the downstream side sliding portion has a first sliding surface sliding with the inner peripheral surface of the belt in a downstream of the holding portion with respect to a rotational direction of the belt, wherein the upstream side sliding portion has a second sliding surface sliding with the inner peripheral surface of the belt in an upstream of the holding portion with respect to the rotational direction of the belt, wherein the first sliding surface and the second sliding surface slide with the belt in a side of the rotatable member to the heater, wherein the second sliding surface has a curved shape, and when a force applied to the belt with respect to a length of the second sliding surface in the rotational axis direction is defined as w (N/mm) and a curvature radius of the second sliding surface is defined as R (mm), R/w of the second sliding surface is equal to 5 ($mm^2$/N) or larger and equal to 80 ($mm^2$/N) or less.

Further features of the present invention will become apparent from the following description of exemplary embodiments with reference to the attached drawings.

Figure 5:
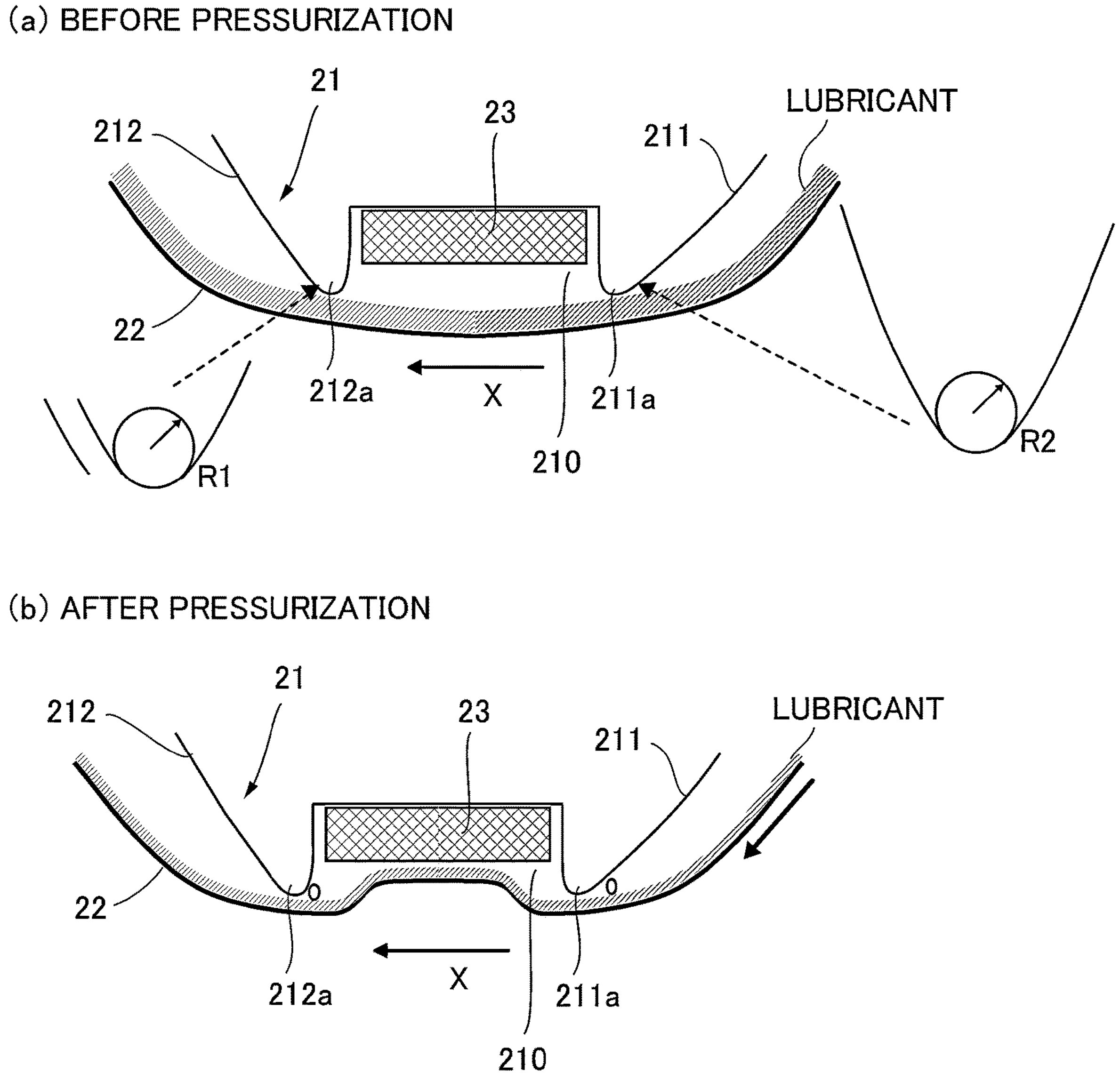

Part (a) and part (b) of FIG. 5 are sectional views showing the pressing pad according to the embodiment, part (a) of FIG. 5 shows a state of the pressing pad before pressing, and part (b) of FIG. 5 shows a state of the pressing pad after pressing.

Figure 6:
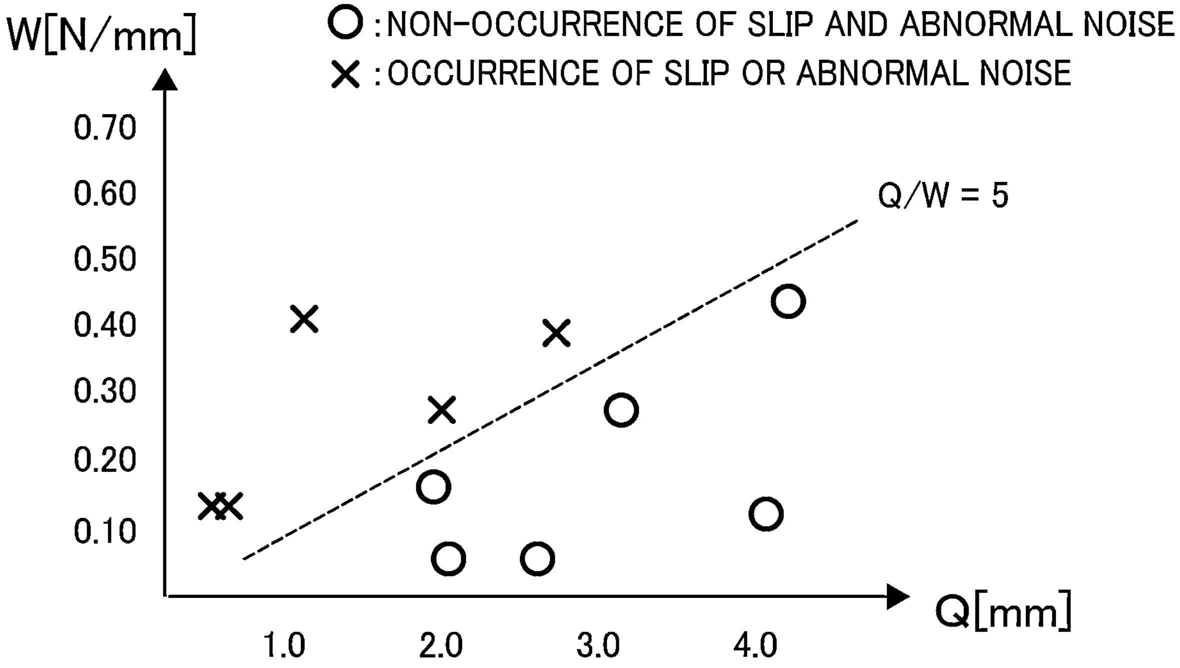

FIG. 6 is a graph showing a relationship between an equivalent radius of curvature and a line load with respect to a width direction.

Figure 7:
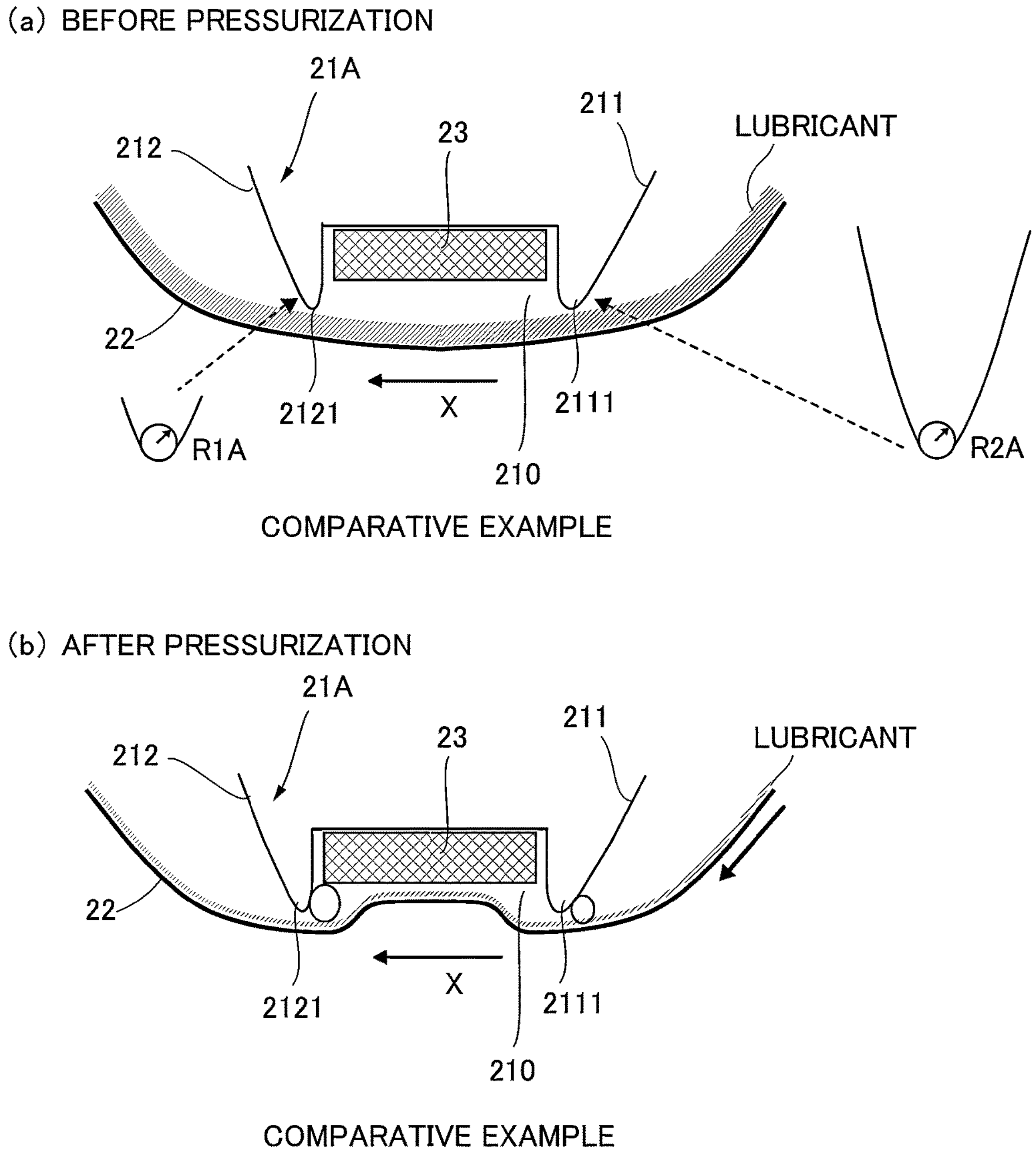

Part (a) and part (b) of FIG. 7 are sectional views showing the pressing pad according to a comparative example, part (a) of FIG. 7 shows a state of the pressing pad before pressing, and part (b) of FIG. 7 shows a state of the pressing pad after pressing.

DESCRIPTION OF THE EMBODIMENTS

<Image Forming Apparatus>

Figure 1:
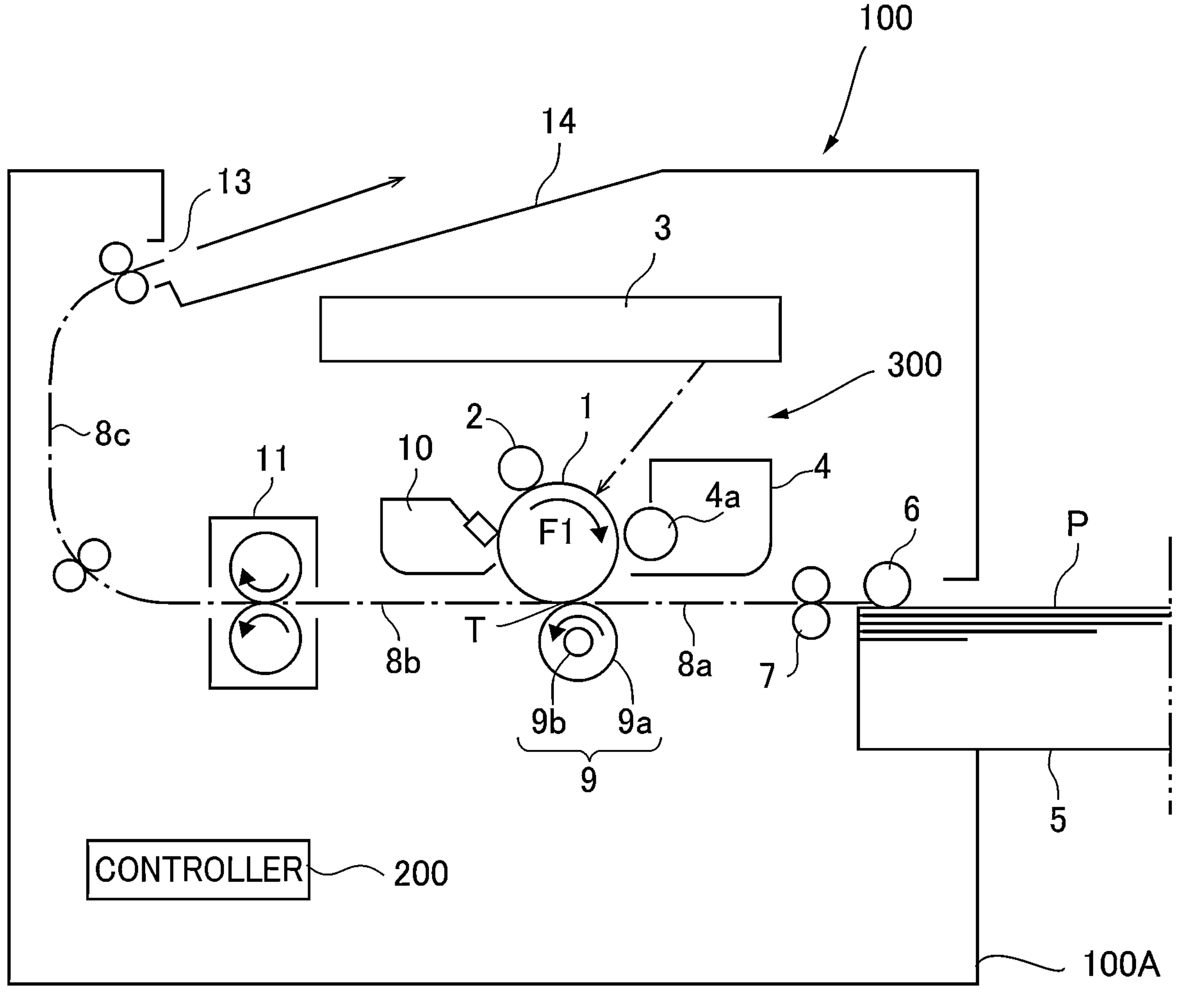
FIG. 1 is a schematic diagram showing an image forming apparatus which is suitable by using a fixing device according to the embodiment.

An image forming apparatus which is suitable for applying a fixing device according to the embodiment will be described by using FIG. 1. An image forming apparatus 100 which is shown in FIG. 1 forms an image on recording material P according to image information which is sent from an external device (not shown), such as a computer or a document reading apparatus, which is provided outside a main assembly 100A, for example. Incidentally, the recording material P may be various types of sheet materials, such as paper of plain paper, cardboard, rough paper, uneven paper, coated paper, etc., plastic film, cloth, etc.

The photosensitive drum 1 is an electrophotographic photosensitive member in which a photosensitive layer is formed on an outer peripheral surface of an aluminum cylinder, for example, and is rotated in a direction of an arrow F1 at a predetermined process speed by a motor (not shown). A surface of the photosensitive drum 1 is uniformly charged to a predetermined potential by a charging roller 2, and an electrostatic latent image is formed on the surface by laser light which is output from an exposure device 3 according to image information from an external device. A developing device 4 develops the electrostatic latent image into a toner image by applying developer.

The recording material P is preliminarily stacked in a cassette 5, and is supplied one sheet by one sheet from the cassette 5 to a feeding passage 8*a* by a supplying roller 6, and is fed at a predetermined timing by a registration roller pair 7 to a transfer nip portion T which is formed when a transfer roller 9 abuts against the photosensitive drum 1. When the recording material P passes through the transfer nip portion T, the toner image on the photosensitive drum 1 is transferred onto the recording material P as transfer voltage is applied to the transfer roller 9 by an unshown power source. Incidentally, transfer residual toner which remains on the photosensitive drum 1 without being transferred to the recording material P is removed from the photosensitive drum 1 by a cleaning device 10.

The recording material P which has passed through the transfer nip portion T is fed to a fixing device 11, and the toner image on the recording material P is fixed when heat and pressure are applied by the fixing device 11. And the recording material P, which has passed through the fixing device 11, passes through the feeding passage 8*c* and is discharged from a discharging port 13 to a placing portion 14 which is provided on a top surface of the main assembly 100A.

Incidentally, in a case of the embodiment, an image forming unit 300, which forms the toner image on the recording material, is configured of the photosensitive drum 1, the charging roller 2, the exposure device 3, the developing device 4, the transfer roller 9 which are described above, as well as an unshown motor and power source, etc. And the image forming unit 300, the fixing device 11, etc. are controlled by a control portion 200 which is provided in the main assembly 100A.

Here, the transfer roller 9 and a transfer voltage control for the transfer roller 9 will be explained. In general, as for the transfer roller 9, an elastic sponge roller in which a semiconductive elastic layer 9*a*, whose resistance is adjusted to approximately "from $1\times10^{6}$ to $1\times10^{10}\Omega$" with carbon, ion conductive filler, etc., on an outer periphery of a core metal 9*b* of stainless steel (SUS), iron, etc. In the embodiment, an ion conductive transfer roller 9 in which an elastic layer 9*a* is formed in a form of a roller with a conductive sponge which is formed by reacting NBR rubber and a surfactant, etc., on the outer periphery of the core metal 9*b*, is applied.

Incidentally, resistance value of the elastic layer 9*a* is set to be "from $1\times10^{8}$ to $5\times10^{8}\Omega$". In general, the resistance of the transfer roller 9 is easy to change depending on temperature and humidity inside the main assembly 100A, and when the resistance of the transfer roller 9 changes, it may cause a transfer defect. Therefore, in the embodiment, in order to suppress an occurrence of the transfer defect which is caused by the resistance change of the transfer roller 9, a transfer voltage control, which preliminarily detects the resistance value of the transfer roller 9 and controls the transfer voltage which is applied to the transfer roller 9 appropriately according to the detected result, is applied. "Active Transfer Voltage Control (ATVC)" has been proposed conventionally as a method of the transfer voltage control, and "ATVC" is used as the method of the transfer voltage control in the embodiment.

"ATVC" is a control method which optimizes the transfer voltage which is applied to the transfer roller 9 during transfer. Simply described, voltage with a predetermined current (constant current) is applied from the transfer roller 9 to the photosensitive drum 1 during standby of the image forming apparatus 100, the resistance of the transfer roller 9 is detected from the voltage value at that time, and the transfer voltage is applied to the transfer roller 9 according to the resistance value which is detected during transferring. It is possible to suppress the occurrence of the transfer defect due to the change of the resistance of the transfer roller 9 by the "ATVC".

<Fixing Device>

Figure 2:
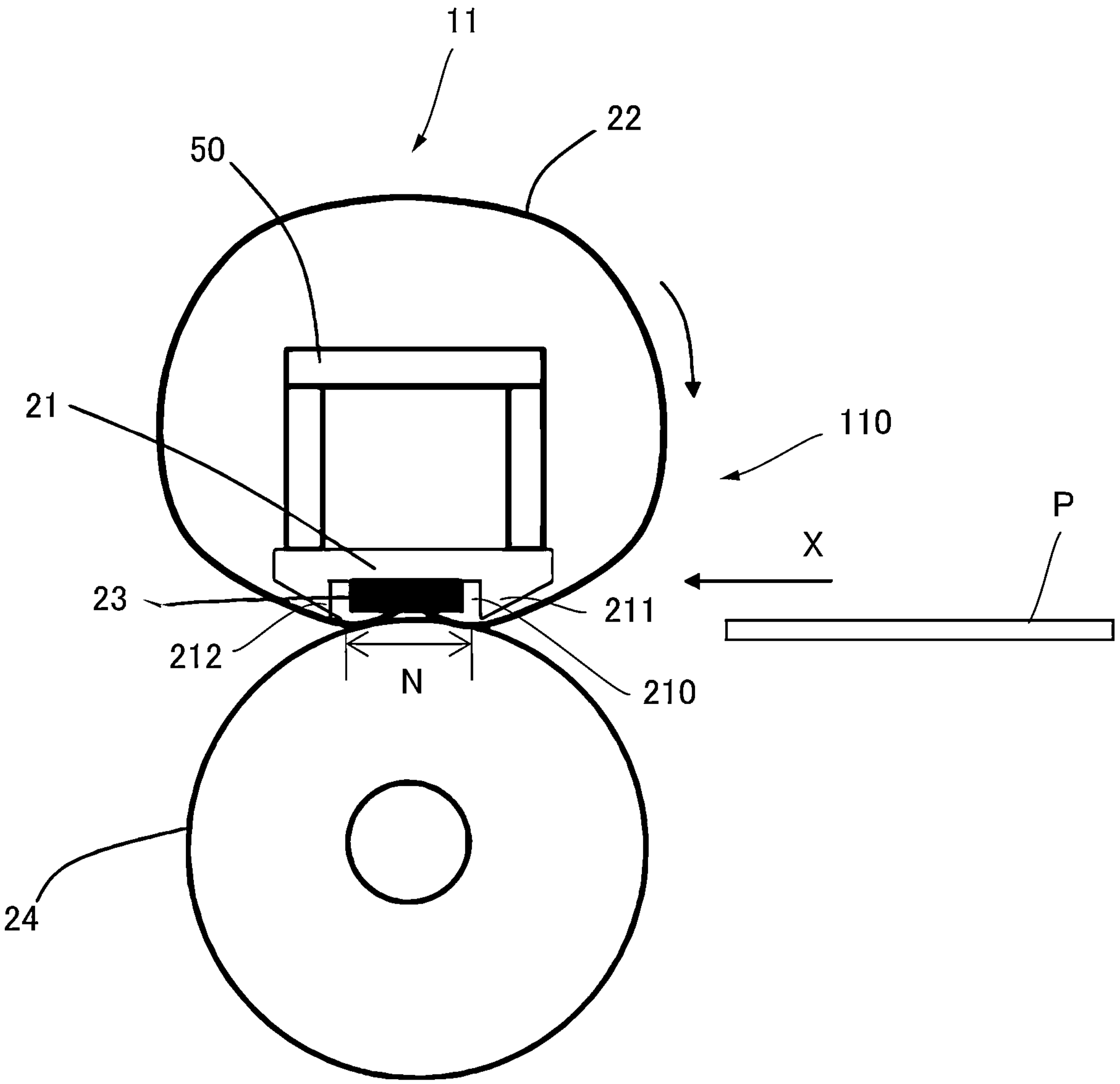
FIG. 2 is a schematic diagram showing the fixing device.

Next, the fixing device 11 according to the embodiment will be described by using FIG. 2 with reference to FIG. 1. As shown in FIG. 2, the fixing device 11 according to the embodiment is generally provided with a fixing film unit 110 and a pressing roller 24, The pressing roller 24 as a rotating member is held in a bearing on the unshown device frame of the fixing device 11 so that both end portions with respect to a direction of a rotational axis are rotatable. Further, the pressing roller 24 abuts against the fixing film 22 of a fixing film unit 110 and is provided so that it is possible to press the fixing film 22. When the pressing roller 24 presses the fixing film 22, a fixing nip portion N between the pressing roller 24 and the fixing film 22 is formed. The pressing roller 24 includes an elastic layer such as silicone rubber of "approximately 3 mm" thickness on an outer periphery of a core metal which is made of metal such as aluminum, for example, and a mold release layer such as perfluoroalkoxyalkane (PFA) or polytetrafluoroethylene (PTFE) of "approximately 30 μm" thickness on an outer periphery of an elastic layer.

When the pressing roller 24 is rotated by an unshown motor, rotational force of the pressing roller 24 is transmitted to the fixing film 22 by frictional force which is generated in the fixing nip portion N, and the fixing film 22 is driven and rotated together with the pressing roller 24. The recording material P is nipped and fed in the fixing nip portion N, and the toner image is fixed on the recording material P when heat and pressure are applied during that time. After the recording material P has passed through the fixing nip portion N, the recording material P separates from the fixing film 22 and the pressing roller 24.

<Fixing Film Unit>

Next, the fixing film unit 110 will be described. The fixing film unit 110 is provided so that it is possible to move toward a side of the pressing roller 24 with respect to the main assembly 100A. The fixing film unit 110 includes the fixing film 22, a pressing pad 21 and a stay 50 which are arranged non-rotatably inside the fixing film 22, and a heater 23 which is held on the pressing pad 21.

<Fixing Film>

The fixing film 22 is an endless belt member which is formed as a thin film with flexibility and heat resistance. The fixing film 22 includes a base layer of nickel which has cylindrical shape and a thickness of 40 μm and is manufactured, for example, by electroforming. In addition to nickel, iron alloy, copper, and silver may be appropriately selected and applied to the base layer. Alternatively, a heat resistant resin (such as polyimide) may be applied. It is preferable that a thickness of the base layer is set to be in a range from 20 μm to 60 μm. A lubricant layer whose thickness is from 10 μm to 50 μm is provided on an inner periphery of the base layer by means of fluororesin, polyimide, etc. in order to reduce sliding friction with the pressing pad 21 and the heater 23. In the embodiment, the lubricant layer of 10 μm thickness is provided by polyimide.

On the other hand, an elastic layer is provided around an outer periphery of the base layer, for example, with heat resistant silicone rubber, etc. It is preferable that the thickness of the elastic layer is set to be in a range from 100 μm to 800 μm. For example, a silicone rubber material with JIS-ASKER-C hardness of 20 and thermal conductivity of 0.8 W/mK may be applied as for the silicone rubber material which forms the elastic layer. A surface release layer of 30 μm thickness is provided on an outer periphery of the elastic layer by fluororesin such as PFA or PTFE, for example. In the embodiment, PFA tube is applied to the surface release layer. Further, the thickness of the elastic layer is set to be 300 μm in order to shorten warm-up time which is required to raise temperature of the fixing film 22 to desired temperature at startup and to obtain a suitable fixed image when fixing a color image by reducing thermal capacity of the fixing film 22.

The fixing film 22 is supported by flange portions which are arranged at both end portions with respect to a width direction which intersects a rotational direction of the fixing film 22, which are not shown in the figure, so that the fixing film 22 is rotatable and its movement with respect to the width direction is restricted. The flange portions are not shown in the figure, however, the flange portions include a cylindrical portion which is fitted into the end portions of the fixing film 22 with respect to the width direction and rotatably supports the end portions with respect to the width direction, and abutting portions which are able to abut against the end portions of the fixing film 22 with respect to the width direction. The cylindrical portion guides the rotation of the fixing film 22 while holding the end portions of the fixing film 22 with respect to the width direction in a cylindrical state from the inside. That is, the fixing film 22 is not stretched over a plurality of stretching rollers, and is a so-called free belt configuration.

Incidentally, the pressing roller 24 and the fixing film 22 may be arranged slightly out of parallel due to mounting error of the pressing roller 24 or the fixing film unit 110, etc. In such a case, the fixing film 22 may be inclined and moved in the width direction while the fixing film 22 is rotating. When the fixing film 22 is inclined and moved in the width direction, the abutting portion of the flange portion receives the end portion of the fixing film 22 with respect to the width direction and regulates movement of the fixing film 22 in the width direction.

<Pressing Pad>

The pressing pad 21 as a nip portion forming member is provided inside the fixing film 22 and form the fixing nip portion N which is described above. The pressing pad 21 is a molded product which extends in the width direction and is formed so that it is possible to hold the heater 23 as a heating means. The pressing pad 21 is formed from a highly heat resistant resin such as polyimide, polyamideimide, PEEK, PPS, liquid crystal polymer, etc. or a composite material which is composed of these resins and ceramics, metals, glass, etc. In the embodiment, the pressing pad 21, which is molded by injecting liquid crystal polymer into a mold, is applied.

The heater 23 which is held by the pressing pad 21 abuts against an inner peripheral surface of the fixing film 22 and heat the fixing film 22. Further, in the embodiment, the pressing pad 21 holds the heater 23 and also has function which guides the fixing film 22. As shown in FIG. 2, the pressing pad 21 guides the fixing film 22 by regulating a track of the fixing film 22 which is rotating from an inside of the fixing film 22 at an upstream side and a downstream side of the recording material P with respect to the feeding direction (direction of arrow X). A shape of the pressing pad 21 according to the embodiment will be described below (refer to FIG. 4 through part (a) and part (b) of FIG. 5).

<Stay>

The stay 50 is, for example, a rigid member (metal plate) which is made of metal extending in the width direction along the fixing film 22, and is formed in a substantially U shape in cross section which is opened on a side of the pressing pad 21. The stay 50 reinforces the pressing pad 21 so that the pressing pad 21 will not be deformed by pressing force of the pressing roller 24. The flange portions which are described above are fixed to the stay 50 on both end portions with respect to the width direction. The flange portions may be pressed toward the pressing roller 24.

<Lubricant>

The fixing film 22 rotates while it bears the lubricant on its peripheral inner surface in order to slide smoothly against the pressing pad 21 and the heater 23. When the lubricant is interposed between the fixing film 22 and the pressing pad 21 or the heater 23, the sliding frictional resistance on sliding surfaces between the fixing film 22 and the pressing pad 21 or the heater 23 is reduced. In the embodiment, silicone oil (for example, viscosity 1000 cSt at a temperature of 23° C.) is applied as the lubricant. Incidentally, the lubricant is not limited to silicone oil, however, it may be fluorine oil or perfluoropolyether (PEPE) grease.

<Heater>

Next, the heater 23 will be described by using FIG. 3. Incidentally, in order to make description easier to understand, the heater 23 is illustrated by dividing into two parts in FIG. 3, which are a film sliding surface 23A which slides with the fixing film 22 and a film non-sliding surface 23B which is on an opposite side of the film sliding surface 23A which does not slide with the fixing film 22.

Figure 3:
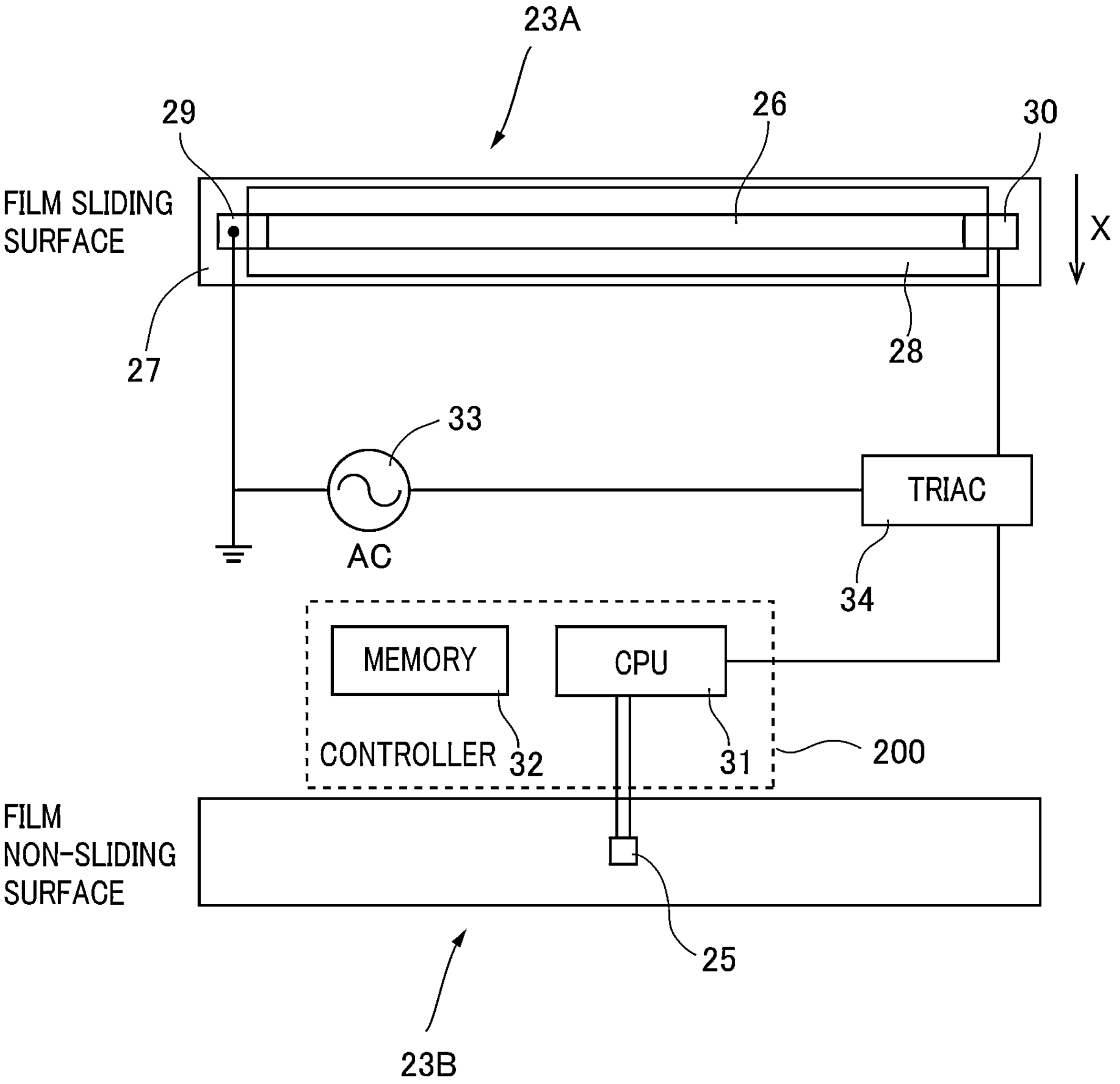
FIG. 3 is a schematic diagram showing a control block of a heater and a heater control system.

The heater 23 is a surface heating member such as a ceramic heater, and includes a ceramic board 27 in which a heating resistor 26 is formed along the width direction on a side of the film sliding surface 23A as shown in FIG. 3. The ceramic board 27 is arranged so that a longitudinal direction of the ceramic board 27 is substantially aligned with a direction which intersects the feeding direction of the recording material P (direction of arrow X). Material which is excellent in heat resistance, insulation, and thermal conductivity is applied to the ceramic board 27, and aluminum nitride is applied in the embodiment. Incidentally, dimensions of the ceramic board 27 are, for example, 7 mm in width, 360 mm in length, and 1 mm in thickness.

On the ceramic board 27, a surface of the heating resistor 26 is protected by an overcoat layer 28. The overcoat layer 28 is provided to ensure electrical insulation of the heater 23 and sliding properties of the fixing film 22. In the embodiment, a heat resistant glass layer whose thickness is approximately 50 μm is applied as the overcoat layer 28. A power supplying electrode 29 and a power supplying electrode 30 are formed on both end portions of the heating resistor 26. The power supplying electrode 29 and the power supplying electrode 30 are connected to an AC power source 33, and power is supplied from the AC power source 33. In the embodiment, the power supplying electrode 29 and the power supplying electrode 30 are formed on both end portions of the heating resistor 26 by a silver palladium screen printing pattern. That is, the heating resistor 26 is formed linearly on the ceramic board 27 by screen printing using paste in which silver, palladium, glass powder (inorganic binding agent), and organic binding agent are mixed and prepared. Incidentally, in addition to silver palladium (Ag/Pd), electrical resistance material such as RuO2 and Ta2N, may be applied to the heating resistor 26. Further, resistance value of the heating resistor 26 is set to be 20Ω at room temperature.

In the embodiment, it is configured that temperature of the heater 23 is detectable by a thermistor 25. The thermistor 25, which is not shown in the figure, is configured to be provided with ceramic paper with heat insulating properties on high heat resistant liquid crystal polymer and on which a chip thermistor element is fixed. The thermistor 25 is possible to detect the temperature of the heater 23 by pressing a side of the chip thermistor element against the film non-sliding surface 23B. Incidentally, the thermistor 25 is provided inside of a minimum sheet passing region and is connected to CPU 31. And the heater 23 is held in the pressing pad 21 while the film non-sliding surface 23B is opposed to a side of the stay 50 (refer to FIG. 1). In this way, the heater 23 slides with the inner peripheral surface of the fixing film 22 and it is possible to apply heat to the toner image on the recording material P through the fixing film 22 from the heater 23.

Next, temperature control of the heater 23 will be described by using FIG. 3. Incidentally, the control portion 200 which is capable of controlling the temperature of the heater 23 in the embodiment may be connected to various motors and various power sources, for example, other than those shown in the figure, however, since they are not a main objective of the present invention here, their illustrations and descriptions are omitted.

The control portion 200 performs various controls of the image forming apparatus 100 (refer to FIG. 1) such as image forming operation, and includes, for example, a CPU (Central Processing Unit) 31 and a memory 32. The memory 32 is configured of ROM (Read Only Memory), RAM (Random Access Memory), etc., and stores various programs and data which control the image forming apparatus 100, etc. The CPU 31 is possible to execute various programs, for example, such as an image forming job (not shown), etc. which are stored in the memory 32, and is able to operate the image forming apparatus 100 to form an image on the recording material P. In the embodiment, the control portion 200 is able to adjust the temperature of the heater 23 by controlling power supply to the heater 23 from the AC power source 33. Incidentally, the memory 32 is able to temporarily store results of arithmetic processing which are related to execution of various programs.

When the AC power source 33 energizes the heating resistor 26 through the power supplying electrode 29 and the power supplying electrode 30 and the temperature the heater 23 is raised, the thermistor 25 detects temperature rise of the heater 23. And A/D converted signal from an output of the thermistor 25 is input to the control portion 200. Based on the signal, the control portion 200 controls the power which energizes the heating resistor 26 with a triac 34 by phase control or frequency control, etc. In this way, the temperature control of heater 23 is performed.

The control portion 200 is possible to keep the heater 23 at a constant temperature by controlling the energization of the heater 23 with the AC power source 33 so that the temperature is raised when the temperature which is detected by the thermistor 25 is lower than a predetermined set temperature and the temperature is decreased when the temperature is higher than the set temperature. In the embodiment, the power which energizes the heating resistor 26 is varied in 21 steps in 5% increments in the range from 0% to 100% by the phase control. An output of 100% is defined as an output when the heater 23 is fully energized. When the temperature of the heater 23 rises to the predetermined temperature and rotational speed of the fixing film 22 stabilizes, the control portion 200 orders to feed the recording material P to the fixing nip portion N between the fixing film 22 and the pressing roller 24. Incidentally, a belt ceramic heater is applied to heat the fixing film 22 in the embodiment, however, it is not limited to this, for example, a halogen heater or an induction heater, etc. may be used.

<Shape of the Pressing Pad>

Figure 4:
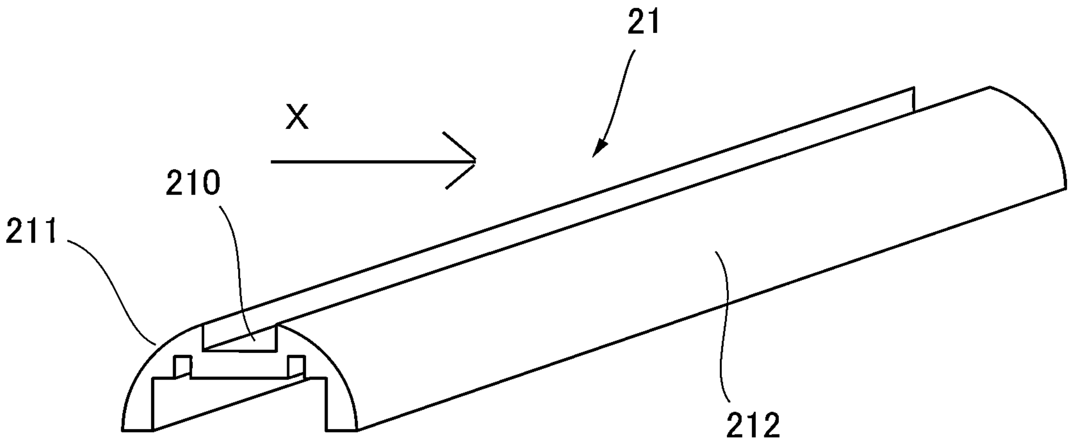
FIG. 4 is a perspective view showing a pressing pad.

Next, a shape of the pressing pad 21 according to the embodiment will be described by using FIG. 4 through part (b) of FIG. 5 with reference to FIG. 2. As shown in FIG. 4, in the pressing pad 21, an engaging groove portion 210, which is able to engage and hold the heater 23, is formed in a shape which extends along the width direction on an opposite side of the stay 50. The pressing pad 21 includes an upstream side sliding portion 211 in an upstream of the engaging groove portion 210 and a downstream sliding portion 212 in a downstream side of the engaging groove portion 210 with respect to the feeding direction of the recording material P (direction of arrow X). The upstream side sliding portion 211 slides on the inner peripheral surface of the fixing film 22 in the upstream of the engaging groove portion 210 and regulates the track of the fixing film 22, while the downstream side sliding portion 212 slides on the inner peripheral surface of the fixing film 22 in the downstream of the engaging groove portion 210 and regulates the track of the fixing film 22.

Part (a) of FIG. 5 and part (b) of FIG. 5 are sectional views showing the pressing pad 21 according to the embodiment, part (a) of FIG. 5 is showing a state before pressing by the pressing roller 24 and part (b) of FIG. 5 is showing a state after pressing by the pressing roller 24. As shown in part (a) of FIG. 5 and part (b) of FIG. 5, the downstream side sliding portion 212 protrudes from a bottom surface of the engaging groove portion 210 more toward a side of the pressing roller 24 (a side of the rotating member) than the heater 23 in the downstream of the engaging groove portion 210 with respect to the feeding direction of the recording material P (direction of the arrow X) when the pressing pad 21 is viewed in the width direction (direction of the rotational axis of the pressing roller 24). Further, the upstream side sliding portion 212 protrudes from a bottom surface of the engaging groove portion 210 more toward the side of the pressing roller 24 than the heater 23 in the upstream of the engaging groove portion 210 with respect to the feeding direction of the recording material P (direction of the arrow X). This is to prevent the fixing film 22 from hooking an edge of the heater 23 by protruding the downstream side sliding portion 212 and the upstream side sliding portion 211 more toward the side of the pressing roller 24 than the heater 23.

And the downstream side sliding portion 212 is formed in a shape in which a first sliding surface 212*a* which slides on the inner peripheral surface of the fixing film 22 has a curvature, and the upstream side sliding portion 211 is formed in a shape in which a second sliding surface 211*a* which slides on the inner peripheral surface of the fixing film 22 has a curvature. The first sliding surface 212*a* of the downstream side sliding portion 212 and the second sliding surface 211*a* of the upstream side sliding portion 211 will be described below.

Comparative Example

First of all, a comparative example will be described. Part (a) of FIG. 7 and part (b) of FIG. 7 are sectional views showing a pressing pad 21A according to the comparative example, part (a) of FIG. 7 shows a state before pressing by the pressing roller 24 and part (b) of FIG. 7 shows a state after pressing by the pressing roller 24. The pressing pad 21A according to the comparative example also includes the upstream side sliding portion 211 in the upstream of the engaging groove portion 210 and the downstream sliding portion 212 in the downstream side of the engaging groove portion 210. And the downstream side sliding portion 212 is formed in a shape in which a first sliding surface 2121 which slides on the inner peripheral surface of the fixing film 22 has a curvature, and the upstream side sliding portion 211 is formed in a shape in which a second sliding surface 2111 which slides on the inner peripheral surface of the fixing film 22 has a curvature.

Here an equivalent radius of curvature (Q) is described as in Formula 1 below, in which a leading end radius of curvature at the upstream side sliding portion (or the downstream side sliding portion) of the pressing pad is defined as "R" and a radius of curvature of the sliding surface of the upstream side sliding portion (or the downstream side sliding portion) is defined as "G".

$$1/Q = 1/R - 1/G \qquad \text{(Formula 1)}$$

Incidentally, in the description, the leading end radius of curvature "R" of the upstream side sliding portion (or downstream side sliding portion) is a radius of curvature of an approximate curve which passes through three points, which are a center point on the sliding surface, a most upstream point on the sliding surface in which it slides on the fixing film, and a most downstream point on the sliding surface in which it slides on the fixing film with respect to the feeding direction of the recording material P. Further, the radius of curvature "G" of the sliding surface of the upstream side sliding portion (or downstream side sliding portion) is a radius of curvature of an approximate curve which passes through three points, which are a center point of the sliding surface, a point in which a gap of 10 μm to 20 μm is left between the upstream side sliding portion (or downstream side sliding portion) and the fixing film in the upstream side, and a point in which a gap of 10 μm to 20 μm is left between the upstream side sliding portion (or downstream side sliding portion) and the fixing film in the downstream side with respect to the feeding direction of the recording material P on the fixing film 22.

In the comparison example, a radius of curvature (R2A) of the second sliding surface 2111 is, for example, 0.6 mm, and a radius of curvature (G2A) of the fixing film 22 at the second sliding surface 2111 is sufficiently large compared to the radius of curvature (R2A) of the second sliding surface 2111. Therefore, the equivalent radius of curvature (Q2A) at the second sliding surface 2111 is approximately 0.6 mm.

In the comparison example, the radius of curvature of the first sliding surface 2121 (R1A) is 0.4 mm, which is smaller than the radius of curvature of the second sliding surface 2111 (R2A). In contrast, the radius of curvature of the fixing film 22 at the first sliding surface 2121 (G1A) is sufficiently large compared to the radius of curvature at the first sliding surface 2121 (RIA), so the equivalent radius of curvature at the first sliding surface 2121 (Q1A) is approximately 0.4 mm.

In the comparative example, during pressing by the pressing roller 24, a load on the fixing film 22 and each of the upstream side sliding portion 211 and the downstream side sliding portion 212 is 45 N, and each of line loads (w2, w1) in the width direction is calculated as 0.14 N/mm. Here, when a parameter of easiness of lubricant circulation is defined as "Q/w", an experiment which is conducted by inventors of the present invention shows that the larger Q/w is, the more easily the lubricant is circulated by the fixing film 22. In the comparative example, "Q2A (≈R2A)/w2" of the second sliding surface 2111 is approximately 4.3 $mm^2/N$ and "Q1A (≈R1A)/w1" of the first sliding surface 2121 is approximately 2.9 $mm^2/N$.

In contrast, in the embodiment, the radius of curvature of the second sliding surface 211*a* (R2, refer to part (a) of FIG. 5) is 2.5 mm, which is larger than the comparison example. And the radius of curvature of the fixing film 22 at the second sliding surface 211*a* (G2) is sufficiently large compared to the radius of curvature of the second sliding surface 211*a* (R2). Therefore, the equivalent radius of curvature at the second sliding surface 211*a* (Q2; "1/Q2=1/R2-1/G2") is 2.5 mm, which is substantially same as the radius of curvature of the second sliding surface 211*a* (R2).

Further, the radius of curvature of the first sliding surface 212*a* (R1, refer to part (a) of FIG. 5) is 2.0 mm, which is smaller than the radius of curvature of the second sliding surface 211*a* (R2), but larger than the comparison example. And the radius of curvature of the fixing film 22 at the first sliding surface 212*a* (G1) is sufficiently large compared to the radius of curvature of the first sliding surface 212*a* (R1). Therefore, the equivalent radius of curvature at the first sliding surface 212*a* (Q1; "1/Q1=1/R1-1/G1") is 2.0 mm, which is substantially same as the radius of curvature of the first sliding surface 212*a* (R1).

In the embodiment, during pressing by the pressing roller 24, a load on the fixing film 22 and each of the upstream side sliding portion 211 and the downstream side sliding portion 212 is 20 N, and each of line loads (w2, w1) in the width direction is calculated as 0.06 N/mm. In the embodiment, "Q2/w2" (substantially "R2/w2") of the second sliding surface 211*a* is approximately 42 $mm^2/N$ and "Q1/w1" (substantially "R1/w1") of the first sliding surface 212*a* is approximately 33 $mm^2/N$, which is smaller than "Q2/w2" of the second sliding surface 211*a*.

<Experiment>

The inventors conducted an experiment to compare the embodiment with comparative examples. The results of the experiment are shown in Table 1.

TABLE 1

| | Viscosity of silicone oil at 23° C. | Slip | Noise |
|---|---|---|---|
| Comparison example 1 | 1,000 cst | Good | Bad |
| Embodiment | 1,000 cst | Good | Good |
| Comparison example 2 | 10,000 cst | Bad | Good |
| Comparison example 3 | 100 cst | Good | Bad |

A first aspect of the experiment is suppression of slippage which occurs, for example, when the image forming apparatus 100 is started in a state that the fixing film 22 and the pressing roller 24 are cold. For example, in a case that the power source of the image forming apparatus 100 which was stopped at night is turned on first thing in the morning, the fixing film 22 and the pressing roller 24 cools to room temperature, and sliding resistance between the fixing film 22 and the heater 23 is high due to high viscosity of the lubricant. In this case, torque of a motor (not shown) which drives the pressing roller 24 becomes high when the pressing roller 24 is started to drive. In this case, the fixing film 22 is not able to follow rotation of the pressing roller 24, and slippage may occur. For example, pressing pressure with the pressing roller 24 is set to 300 N and the rotational speed of the pressing roller 24 is set to be 300 mm/s.

In a case of the comparison example 1, the rotational torque of the motor for startup is 2.4 kg·cm, and in a case of the embodiment, the rotational torque of the motor for startup is 2.0 kg·cm. In the embodiment, the rotational torque is decreased compared to the comparative example, however, slippage does not occur in both of the cases. It is found that an amount of lubricant which is intercepted by the upstream side sliding portion 211 and the downstream side sliding portion 212 is different between the comparative example 1 and the embodiment, when factors which decrease the rotational torque of the motor are investigated.

In the comparative example 1, an amount of lubricant which is intercepted in the upstream side sliding portion 211 is smaller than an amount of lubricant which is intercepted in the downstream side sliding portion 212. On the other hand, in the embodiment, as for an amount of lubricant which is intercepted in the upstream side sliding portion 211 and the downstream side sliding portion 212, an amount of lubricant which is intercepted in the upstream side sliding portion 211 is smaller than an amount of lubricant which is intercepted in the downstream side sliding portion 212, however, the amount of lubricant which is intercepted in each of them is even smaller than in the comparative example 1.

Based on this, it is confirmed that the larger "Q/w", the smaller the amount of lubricant which is intercepted and the larger film thickness of lubricant which is possible to pass through. Therefore, it is considered that a factor which decrease the rotational torque is that the larger "Q/w" is, the more the film thickness of the lubricant which passes through the upstream side sliding portion 211 and the downstream side sliding portion 212 increases and the fixing film 22 and the heater 23 approach fluid lubrication in which the fixing film 22 and the heater 23 slide through the lubricant. That is, in order to suppress slippage, the smaller one of "Q2/w2" of the second sliding surface 211*a* in the upstream side sliding portion 211 and "Q1/w1" of the first sliding surface 212*a* in the downstream side sliding portion 212 should be as large as possible.

In a case that it is configured of a free belt as in the embodiment, since it is necessary to provide protruding portions such as the upstream side sliding portion 211 and the downstream side sliding portion 212 in order to regulate the track of the fixing film 22, somewhat high line loads are applied to the upstream side sliding portion 211 and the downstream side sliding portion 212. In such a configuration, there is a risk of intercepting the lubricant as described above, however, it is possible to easily maintain film thickness of the lubricant which enters the fixing nip portion N by increasing the equivalent radius of curvature "Q" or decreasing the line pressure "w".

A second aspect of the experiment is suppression of abnormal noise such as film squeal which occurs during heating of the heater 23. The hotter the fixing film 22 becomes in response to heating of the heater 23, the lower the viscosity of the lubricant, so the thickness of the lubricant which passes through the upstream side sliding portion 211 and the downstream side sliding portion 212 becomes small and an amount of the lubricant which is supplied to the heater 23 becomes less. Therefore, the film thickness of the lubricant between the fixing film 22 and the heater 23 becomes thinner. When this occurs, ratio of points in which the fixing film 22 and the heater 23 slide each other without the lubricant is increased and it becomes in a mixed lubrication state in which fluid lubrication which involves the lubricant and boundary lubrication which contacts between solids are mixed, so abnormal noise is generated by causing stick-slip. In an experiment to confirm the abnormal noise, the pressure of the pressing roller 24 is set to 300 N, the temperature of the heater 23 is set to 220° C., and the rotational speed of the pressing roller 24 is gradually reduced from 300 mm/s. And it is possible to evaluate the film thickness of the lubricant by the rotational speed of the pressing roller 24 when the abnormal noise occurs.

The rotational speed of the pressing roller 24 when the abnormal noise occurred in the comparative example 1 is 90 mm/s. In contrast, in the embodiment, even when the rotational speed of the pressing roller 24 is reduced to 10 mm/s, the abnormal noise is not occurred. That is, it is considered to be because in the embodiment it is possible to maintain a thicker film thickness of the lubricant between the fixing film 22 and the heater 23, and therefore it is possible to maintain fluid lubrication in which the fixing film 22 and the heater 23 slide each other through the lubricant. As described above, it is found that the embodiment in which "Q/w" is larger is advantageous in terms of suppression of the slippage and the abnormal noise.

In contrast, an attempt to prevent these problems with the viscosity of the lubricant is a comparative example 2 and a comparative example 3 which are shown in Table 1. In a case that the lubricant with low viscosity is applied, the viscosity of the lubricant is low at the first startup in the morning and it is possible to lower the rotational torque of the motor, so it is possible to suppress to occur slippage. However, the higher the temperature becomes, the lower the viscosity becomes, and the film thickness of the lubricant which passes through the upstream side sliding portion 211 and the downstream side sliding portion 212 becomes small and the amount of the lubricant which is supplied to a space between the fixing film 22 and the heater 23 becomes small, so the abnormal noise is more likely to occur at high temperature. Further, in a case that the lubricant with high viscosity is applied, contrary to the case when the lubricant with low viscosity is applied, it is possible to suppress to occur the abnormal noise but slippage is more likely to occur.

Results of these experiment with various conditions of "Q/w" are shown in FIG. 6. In FIG. 6, "o" indicates that both of the slippage and the abnormal noise are not occurred, while "x" indicates that at least one of the slippage and the abnormal noise is occurred. As it is found from FIG. 6, when "Q/w" is greater than 5 $mm^2$/N, it is possible to suppress the slippage and the abnormal noise.

In Table 2, "Q/w" for the image forming apparatus whose leading end margin (mm) is 3.5 mm and "Q/w" for the image forming apparatus whose leading end margin (mm) is 5.5 mm are shown as examples. In Table 2, "o" indicates that the slippage and the abnormal noise are not occurred, and furthermore, that separability between the recording material P and the fixing film 22 is excellent and unevenness in temperature is not occurred on the fixing film. "Δ" indicates that the slippage and the abnormal noise are not occurred, and furthermore, the separability between the recording material P and the fixing film 22 is excellent and the unevenness in temperature is occurred on the fixing film. "x" indicates that at least one of the slippage and the abnormal noise are occurred, and in addition to this, the separability between the recording material P and the fixing film 22 is not good.

TABLE 2

| Leading end margin (mm) | Q/W ($mm^2$/N) | | | | | | |
|---|---|---|---|---|---|---|---|
| | 5 | 10 | 30 | 50 | 80 | 150 | 300 |
| 3.5 | ○ | ○ | ○ | Δ | Δ | x | x |
| 5.5 | ○ | ○ | ○ | ○ | ○ | Δ | Δ |

In a case that "Q/w" is large, that is, a case that the equivalent radius of curvature "Q" is large or the line pressure "w" is small, since the track of the fixing film 22 at the downstream side sliding portion 212 becomes gentle, the separability between the recording material P and the fixing film 22 is decreased.

Therefore, in the embodiment, it is only necessary that at least smaller one of "Q2/w2" of the second sliding surface 211*a* of the upstream side sliding portion 211 or "Q1/w1" of the first sliding surface 212*a* of the downstream side sliding portion 212 satisfies "equal to 5 ($mm^2$/N) or larger and equal to 80 ($mm^2$/N) or less". Alternatively, it is only necessary that both "Q1/w1" of the first sliding surface 212*a* and "Q2/w2" of the second sliding surface 211*a* satisfies "equal to 5 ($mm^2$/N) or larger and equal to 80 ($mm^2$/N) or less".

This is because when either "Q1/w1" or "Q2/w2" is smaller than 5 ($mm^2$/N), the lubricant is easily scraped off by the upstream side sliding portion 211 and the downstream side sliding portion 212 (that is, the amount of the lubricant which is intercepted is large), and an amount of the lubricant which is borne on the fixing film 22 become too little and the film thickness of the lubricant which enters the fixing nip portion N becomes thin. On the other hand, because when either "Q1/w1" or "Q2/w2" is larger than 80 ($mm^2$/N), the lubricant is not easily scraped off by the upstream side sliding portion 211 and the downstream side sliding portion 212 (that is, the amount of the lubricant which is intercepted is small), however, the amount of the lubricant which is borne on the fixing film 22 become too much and it is difficult to be borne, and as a result, the film thickness of the lubricant which enters the fixing nip portion N becomes thin. Incidentally, it is preferable that "Q1/w1" of the first sliding surface 212*a* is "equal to 10 ($mm^2$/N) or larger, and equal to 30 ($mm^2$/N) or less" from a viewpoint of the separability of the recording material P. When "Q1/w1" is "equal to 10 ($mm^2$/N) or larger, and equal to 30 ($mm^2$/N) or less", the separation of the recording material P is excellent.

As described above, in the embodiment, with respect to the pressing pad 21, at least smaller one of "Q2/w2" of the second sliding surface 211*a* of the upstream side sliding portion 211 and "Q1/w1" of the first sliding surface 212*a* of the downstream side sliding portion 212 satisfies "equal to 5 ($mm^2$/N) or larger and equal to 80 ($mm^2$/N) or less". In order to do so, the pressing pad 21, in which the upstream side sliding portion 211 and the downstream side sliding portion 212 are formed, is arranged non-rotatably inside the fixing film 22. By doing this, it is possible to maintain thick film thickness of the lubricant between the fixing film 22 and the heater 23, and uneven temperature in the fixing film 22 which is caused by the lubricant is not occurred, and it is possible to prevent the fixing film 22 from slipping and generating the abnormal noise.

Other Embodiment

Incidentally, in the embodiment which is described above, a direct transfer method in which the toner image which is formed on the photosensitive drum is directly transferred to the recording material is described, however, it is possible to apply to an intermediary transfer method in which the toner image which is formed on the photosensitive drum is transferred to an intermediary transfer belt.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-095966 filed on Jun. 14, 2022, which is hereby incorporated by reference herein in its entirety.

What is claimed is:

1. A fixing device comprising:

an endless and rotatable belt of which an inner peripheral surface is applied with lubricant;

a heater configured to heat the inner peripheral surface of the belt;

a rotatable member configured to rotatably contact the belt; and a nip portion forming member in contact with the inner peripheral surface of the belt, configured to nip the belt with the rotatable member and form a nip portion, wherein the belt applies heat and pressure to a recording material on which a toner image is carried in the nip portion with the rotatable member to fix, wherein the nip portion forming member includes a holding portion, an upstream side sliding portion and a downstream side sliding portion, wherein the holding portion holds the heater in a rotational axis direction of the rotatable member, wherein the downstream side sliding portion has a first sliding surface sliding with the inner peripheral surface of the belt in a downstream of the holding portion with respect to a rotational direction of the belt, wherein the upstream side sliding portion has a second sliding surface sliding with the inner peripheral surface of the belt in an upstream of the holding portion with respect to the rotational direction of the belt, wherein the heater does not protrude toward the rotatable member with respect to a line connecting a point of the first sliding surface slid with the belt and a point of the second sliding surface slid with the belt, and wherein the second sliding surface has a curved shape, and when a force applied to the belt with respect to a length of the second sliding surface in the rotational axis direction is defined as w (N/mm) and a curvature radius of the second sliding surface is defined as R (mm), R/w of the second sliding surface is equal to 5 ($mm^2$/N) or larger and equal to 80 ($mm^2$/N) or less.

2. A fixing device according to claim 1, wherein the curvature radius of the second sliding surface R is 0.025 mm to 4 mm.

3. A fixing device according to claim 2, wherein the first sliding surface has a curved shape, and when a force applied to the belt with respect to a length of the first sliding surface in the rotational axis direction is defined as w1 (N/mm) and a curvature radius of the first sliding surface is defined as R (mm), R1/w1 of the first sliding surface is equal to 5 ($mm^2$/N) or larger and equal to 80 ($mm^2$/N) or less.

4. A fixing device according to claim 3, wherein R of the curvature radius of the second sliding surface is larger than R1 of the curvature radius of the first sliding surface.

5. A fixing device according to claim 3, wherein R/w of the second sliding surface is larger than R1/w1 of the first sliding surface.

6. A fixing device according to claim 1, wherein the heater is a ceramic heater.

* * * * *